United States Patent
Tweet et al.

(10) Patent No.: US 8,896,907 B2
(45) Date of Patent: Nov. 25, 2014

(54) PLASMONIC REFLECTIVE DISPLAY FABRICATED USING ANODIZED ALUMINUM OXIDE

(75) Inventors: Douglas J. Tweet, Camas, WA (US); Akinori Hashimura, Vancouver, WA (US); Paul J. Schuele, Washougal, WA (US); Apostolos T. Voutsas, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 169 days.

(21) Appl. No.: 13/449,370

(22) Filed: Apr. 18, 2012

(65) Prior Publication Data
US 2012/0200817 A1    Aug. 9, 2012

Related U.S. Application Data (63) Continuation-in-part of application No. 13/434,548, filed on Mar. 29, 2012, now Pat. No. 8,810,897, which (Continued)

(51) Int. Cl.
*G02B 26/00* (2006.01)
*G02F 1/1335* (2006.01)

(52) U.S. Cl.
CPC .... *G02F 1/133553* (2013.01); *G02F 2201/124* (2013.01); *G02F 2203/10* (2013.01)
USPC .......................................................... 359/296

(58) Field of Classification Search
CPC .... B82Y 20/00; B82Y 30/00; G02F 2203/10; G02F 1/133528; G02F 2001/133565; G02F 1/133553; G02F 2201/124; G02B 5/208; G02B 5/008; Y10S 977/834; F24J 2/0015; Y02B 10/20

USPC .......... 359/290–296; 349/106; 216/2, 67–71, 216/94, 7
See application file for complete search history.

(56) References Cited

U.S. PATENT DOCUMENTS 5,625,729 A * 4/1997 Brown ............................ 385/31
7,824,535 B2   11/2010 Hatanaka et al.

(Continued)

FOREIGN PATENT DOCUMENTS

JP   2000-098323   * 4/2000 ................ G02F 1/13
JP   2010-185970     8/2010

OTHER PUBLICATIONS

H. Masuda and K. Fukuda, Science 268, 1466 (1995).

(Continued)

*Primary Examiner* — Thomas K Pham
*Assistant Examiner* — Vipin Patel
(74) *Attorney, Agent, or Firm* — Law Office of Gerald Maliszewski; Gerald Maliszewski (57) ABSTRACT

A method is provided for forming a reflective plasmonic display. The method provides a substrate and deposits a bottom dielectric layer. A conductive film is deposited overlying the bottom dielectric layer. A hard mask is formed with nano-size openings overlying the conductive film. The conductive film is plasma etched via nano-size openings in the hard mask, stopping at the dielectric layer. After removing the hard mask, a conductive film is left with nano-size openings to the dielectric layer. Metal is deposited in the nano-size openings, creating a pattern of metallic nanoparticles overlying the dielectric layer. Then, the conductive film is removed. The hard mask may be formed by conformally depositing an Al film overlying the conductive film and anodizing the Al film, creating a hard mask of porous anodized Al oxide (AAO) film. The porous AAO film may form a short-range hexagonal, and long-range random order hole patterns.

17 Claims, 9 Drawing Sheets

Related U.S. Application Data is a continuation-in-part of application No. 12/836,121, filed on Jul. 14, 2010, now Pat. No. 8,368,998, which is a continuation-in-part of application No. 12/646,585, filed on Dec. 23, 2009, now Pat. No. 8,223,425, which is a continuation-in-part of application No. 12/635,349, filed on Dec. 10, 2009, now Pat. No. 8,355,099, which is a continuation-in-part of application No. 12/621,567, filed on Nov. 19, 2009, now Pat. No. 8,339,543, which is a continuation-in-part of application No. 12/614,368, filed on Nov. 6, 2009, now Pat. No. 8,045,107.

(56) References Cited

U.S. PATENT DOCUMENTS

2006/0034729 A1* 2/2006 Poponin .................. 422/82.05
2007/0229817 A1* 10/2007 Wang et al. .................. 356/301
2009/0104406 A1* 4/2009 Rivero .......................... 428/138

OTHER PUBLICATIONS

H. Masuda and M. Satoh, Jpn Appl. Phys., 35, L126 (1996).
A.P. Li, et al., J. Appl. Phys., 84, 6023 (1998).
S.Z. Chu, et al, J. ECS 149, B321 (2002).
Y. Lei and W-K. Chim, Chem. Mater 17, 580 (2005).
C.Y. Han, et al., Langmuir 23, 1564 (2007).
S.K. Park, et al., Current Applied Physics 7, 180 (2007).
T.R.B. Foong, et al., ACS Nano, 2, 2250 (2008).
P.G. Miney, et al., Electrochemical and Solid State Letters 6, B42 (2003).

* cited by examiner

Fig. 5A $n_{min} = n_o$

Fig. 5B $n_{max} = \sqrt{\dfrac{n_e^2 + n_o^2}{2}}$

PLASMONIC REFLECTIVE DISPLAY FABRICATED USING ANODIZED ALUMINUM OXIDE

RELATED APPLICATION

The application is a Continuation-in-Part of a pending application entitled, METHOD FOR IMPROVING METALLIC NANOSTRUCTURE STABILITY, invented by Aki Hashimura et al., Ser. No. 13/434,548, filed on Mar. 29, 2012;

which is a Continuation-in-Part of a pending application entitled, PLASMONIC ELECTRONIC SKIN, invented by Tang et al., Ser. No. 12/836,121, filed on Jul. 14, 2012;

which is a Continuation-in-Part of a pending application entitled, PLASMONIC DEVICE TUNED USING PHYSICAL MODULATION, invented by Tang et al., Ser. No. 12/646,585, filed on Dec. 23, 2009;

which is a Continuation-in-Part of a pending application entitled, PLASMONIC DEVICE TUNED USING LIQUID CRYSTAL MOLECULE DIPOLE CONTROL, invented by Tang et al. Ser. No. 12/635,349, filed on. Dec. 10, 2009;

which is a Continuation-in-Part of a pending application entitled, PLASMONIC DEVICE TUNED USING ELASTIC AND REFRACTIVE MODULATION MECHANISMS, invented by Tang et al., Ser. No. 12/621,567, filed on Nov. 19, 2009;

which is a Continuation-in-Part of a pending application entitled, COLOR-TUNABLE PLASMONIC DEVICE WITH A PARTIALLY MODULATED REFRACTIVE INDEX, invented by Tang et al., Ser. No. 12/614,368, filed on Nov. 6, 2009. All the above-referenced applications are incorporated herein by reference.

BACKGROUND OF THE INVENTION

1. Field of the Invention

This invention, generally relates to plasmonic displays and, more particularly, to a low-cost method for fabricating metallic nanostructures used in plasmonic displays.

2. Description of the Related Art

Reflective display or color-tunable device technology is attractive primarily because it consumes substantially less power than liquid crystal displays (LCDs) and organic light emitting diode (OLED) displays. A typical LCD used in a laptop or cellular phone requires internal (backlight) illumination to render a color image. In most operating conditions the internal illumination that is required by these displays is in constant competition with the ambient light of the surrounding environment (e.g., sunlight or indoor overhead lighting). Thus, the available light energy provided by these surroundings is wasted, and in fact, the operation of these displays requires additional power to overcome this ambient light. In contrast, reflective display technology makes good use of the ambient light and consumes substantially less power.

A number of different reflective display technologies have been developed, such as electrophoretic, electrowetting, electrochromic displays, and interference-based MEMS display. These display technologies all have disadvantages or challenges that must be overcome to obtain greater commercial success. Many existing technologies rely upon phenomena that are intrinsically slow. For example, electrophoretic or electrochemical techniques typically require particles to drift or diffuse through liquids over distances that create a slow response. Some other technologies require high power to operate at video rates. For example, many reflective displays must switch a large volume of material or chromophores from one state to another to produce an adequate change in the optical properties of a pixel. At video switching rates, currents on the order of hundreds of $mA/cm^2$ are necessary if a unit charge must be delivered to each dye molecule to affect the change. Therefore, display techniques that rely on reactions to switch dye molecules demand unacceptably high currents for displaying video. The same holds true for electrochromic displays.

A second challenge for reflective displays is the achievement of high quality color. In particular, most reflective display technologies can only produce binary color (color/black) from one material set. Because of this, at least three sub-pixels using different material sets must be used when employing a side-by-side sub-pixel architecture with fixed colors. This limits the maximum reflected light for some colors to about ⅓, so that the pixels of this type cannot produce saturated colors with a good contrast.

Finally, some reflective displays face reliability problem over a long lifetime. In particular, to sustain video rate operation for a few years requires at least billions of reversible changes in optical properties. Achieving the desired number of cycles is particularly difficult in reflective displays using techniques based on chemical reactions, techniques that involve mixing and separation of particles, or MEMS technology that involves repeated mechanic wear or electric stress.

In polymer-networked liquid crystal (PNLC) or polymer dispersed liquid crystal (PDLC) devices, liquid crystals are dissolved or dispersed into a liquid polymer followed by solidification or curing of the polymer. During the change of the polymer from a liquid to solid, the liquid crystals become incompatible with the solid polymer and form droplets throughout the solid polymer. The curing conditions affect the size of the droplets that in turn affect the final operating properties of the "smart window". Typically, the liquid mix of polymer and liquid crystals is placed between two layers of glass or plastic that includes a thin layer of a transparent, conductive material followed by curing of the polymer, thereby forming the basic sandwich structure of the smart window. This structure is in effect a capacitor.

Electrodes from a power supply are attached to the transparent electrodes. With no applied voltage, the liquid crystals are randomly arranged in the droplets, resulting in scattering of light as it passes through the smart window assembly. This scattering results in a translucent "milky white" appearance. When a voltage is applied to the electrodes, the electric field formed between the two transparent electrodes on the glass causes the liquid crystals to align, allowing light to pass through the droplets with very little scattering and resulting in a transparent state. The degree of transparency can be controlled by the applied voltage. This is possible because at lower voltages, only a few of the liquid crystals align completely in the electric field, so only a small portion of the light passes through while most of the light is scattered. As the voltage is increased, fewer liquid crystals remain out of alignment, resulting in less light being scattered. It is also possible to control the amount of light and heat passing through, when tints and special inner layers are used. It is also possible to create fire-rated and anti X-Ray versions for use in special applications. Most of the devices offered today operate in on or off states only, even though the technology to provide for variable levels of transparency is available. This technology has been used in interior and exterior settings for privacy control (for example conference rooms, intensive-care areas, bathroom/shower doors) and as a temporary projection screen.

The full range of colors produced by plasmon resonances resulting from metal nanostructures has been known since ancient times as a means of producing stained colored glass. For instance, the addition of gold nanoparticles to otherwise transparent glass produces a deep red color. The creation of a particular color is possible because the plasmon resonant frequency is generally dependent upon the size, shape, material composition of the metal nanostructure, as well as the dielectric properties of the surroundings environment. Thus, the optical absorption and scattering spectra (and therefore the color) of a metal nanostructure can be varied by altering any one or more of these characteristics. The parent applications listed above describe means of electronically controlling these color-producing characteristics.

The properties of metallic nanoparticles have drawn significant attention due to their application in photonics and electro-optics, as well as their potential application in biological/chemical sensors and renewable energy. Moreover, the fabrication of periodic metallic nanoparticle arrays for applications in photonics utilizing their localized surface plasmon resonance (LSPR) properties has been extensively studied in recent years. Among various processing techniques, depositing a film of metal on a nano-size patterned mask and using a lift-off process to remove the sacrificial layer is becoming a widely used technique, because it allows for fabricating nanoparticles with precisely controlled shape, size, and particle spacing. Moreover, advanced research has revealed that ordered array nanostructures have improved quantum characteristics utilized in LSPR properties, or photoluminescence and electroluminescence properties of semiconductor nanophosphors. Therefore, a method to achieve ordered nanoparticles and nanostructures is of significant importance.

One method of forming nanoparticles in an ordered array which has been proposed is a nano-imprinting process using a mold to generate ordered dot patterns on poly methyl methacrylate (PMMA) mask layers. After forming an array of nanostructures to a predefined depth, the residual PMMA layers at the bottom of the pattern are removed to reveal the surface underneath the mask. The metallic nanoparticles are formed by depositing the desired metals and removing the PMMA mask layers in a solution to lift off the residual metals deposited on the mask. According to this technique, the size and spacing of the nanostructures are limited by the photolithography patterning capability of the mold. Also, the manufacturing cost is high due to expensive capital costs associated with the nanoimprint lithography process. Alternatively, nano-scale structures can be patterned using e-beam lithography. However, this process is extremely slow and costly.

Among other processing techniques, forming an array of ordered nanostructures using self-assembly solution process is desired due to low capital cost without sacrificing manufacturing scalability. It is possible to anodize an aluminum layer in an electrolyte solution to form aluminum oxide pores with diameters of several nanometers to several hundred of nanometers arranged in hexagonal order. This anodized aluminum oxide (AAO) template can then be used as a mask to generate an array of nanoparticles on a substrate by depositing desired materials and lifting off the mask to form the nanostructures. However, in order to produce a pore that extends all the way through the AAO template, an electrically conductive layer must lie beneath the AAO. Otherwise, the pore formation process will stop with a thick and variable insulating barrier layer beneath each pore, which is difficult to subsequently remove in a uniform fashion. Such a structure would be difficult to use as a mask for reliably patterning nano-scale structures. Thus, it is currently not possible to use an AAO template fabricated directly on an insulating substrate as a mask for producing a high quality array of nanostructures, such as metal nano-dots. It is, however, possible to form the AAO template using a separate Al foil and transfer the template to any desired substrate. However, this process is difficult to scale to large size, due to the delicate nature of the template and its transfer process.

Plasmonic effects are larger if the metal particles are electrically isolated from each other, i.e. they are on an insulating substrate. Also, due to the nature of the liquid crystal used in these displays, it is best to allow a switching electric field parallel to the surface containing the metallic nanoparticle array. Consequently, it is best to have electrodes embedded in this surface, but electrically insulated from the metallic nanoparticles.

It would be advantageous if a nanoparticle array could be fabricated using a low-cost AAO template process which can be scaled to large sizes, and in which the AAO is formed directly on the surface rather than in a separate Al foil. It would also be advantageous if the AAO template fabrication process could be used to control the shape the nanoparticles formed.

SUMMARY OF THE INVENTION

Described herein is a reflective display using plasmonics with an array of metallic nanoparticles on insulating substrate with liquid crystal as a switching medium. Embedded in the insulating substrate are electrodes which enable the electric field to switch the liquid crystal to be parallel to the surface of the metallic nanoparticle array, and so optimize performance. Furthermore, the array of metallic nanoparticles on insulating substrate is fabricated with a low-cost aluminum anodization process that is scalable to large substrate sizes. This is accomplished through the transfer of the nano-scale pattern from the porous aluminum oxide (AAO) mask to an underlying conductive film. This patterned conductive film is then used as a mask for depositing the metallic nanoparticles. The structure and method of fabrication of arrays of metallic nanoparticles on an insulating film with embedded electrodes may also have application to other types of displays as well as other devices, such as biosensors. Furthermore, the structure of metallic nanoparticles on dielectric prevents the problem of galvanic corrosion, thus freeing up the best choice of metal for the given application.

Accordingly, a method is provided for forming a reflective plasmonic display. The method provides a substrate and deposits a bottom dielectric layer. A conductive film is deposited overlying the bottom dielectric layer. A hard mask is formed with nano-size openings overlying the conductive film. The conductive, film is plasma etched via nano-size openings in the hard mask, stopping at the dielectric layer. After removing the hard mask, a conductive film is left with nano-size openings to the dielectric layer. Metal is deposited in the nano-size openings, creating a pattern of metallic nanoparticles overlying the dielectric layer. Then, the conductive film is removed.

In one aspect, the hard mask is formed by conformally depositing Al film overlying the conductive film and anodizing the Al film, creating a hard mask of porous anodized Al oxide (AAO film. In another aspect, the porous AAO film forms a short-range hexagonal order hole pattern and long-range random order hole pattern. Thus, the metallic nanoparticles have a short-range hexagonal order and a long-range random order. Further, the conductive film is deposited with a thickness T, and the hard mask nano-size, openings have a diameter D. The metallic nanoparticles formed have a shape responsive to the aspect ratio of D to T.

Additional details of the above-described method and a reflective plasmonic display are presented below.

DETAILED DESCRIPTION

Figure 1A:
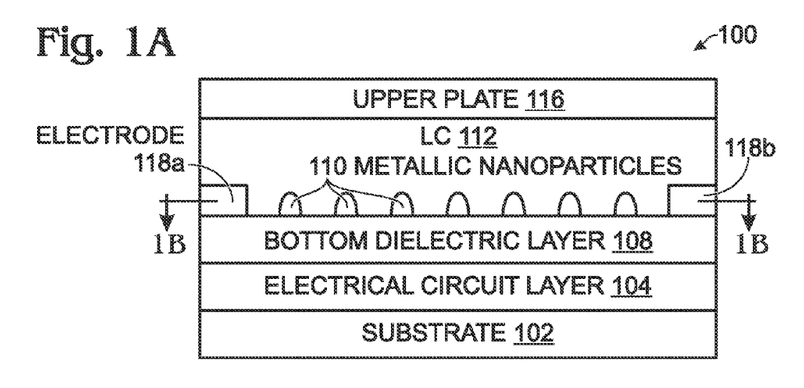
FIGS. 1A through 1C are, respectively, partial cross-sectional, plan, and detailed plan views of a reflective plasmonic display.
Figure 1B:
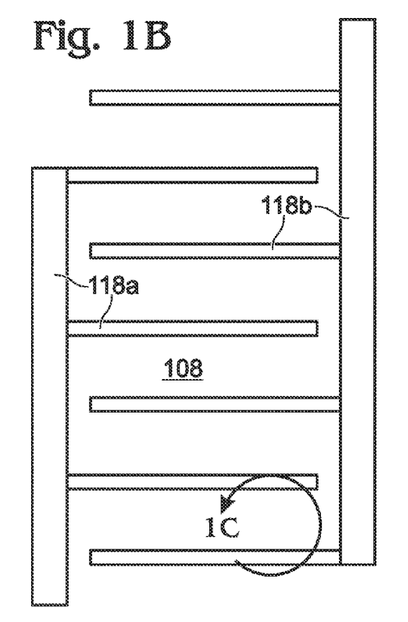
Figure 1C:
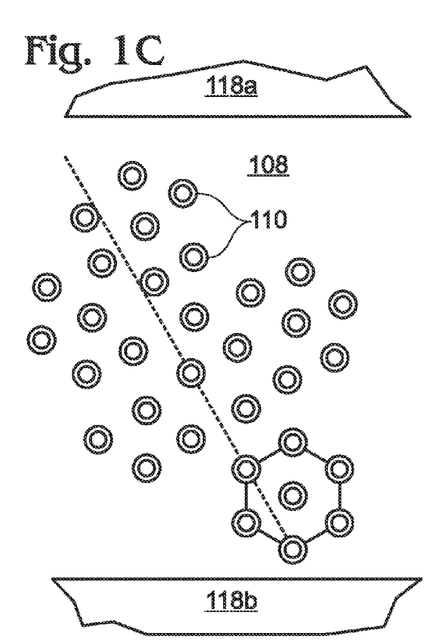

FIGS. 1A through 1C are, respectively, partial cross-sectional, plan, and detailed plan views of a reflective plasmonic display. The display 100 comprises a substrate 102 and an electrical circuit layer 104 with a plurality of pixels 106 overlying the substrate. For simplicity, one portion of a pixel is shown. One of the functions performed by the pixels of the electrical circuit layer may be to selectively pass light from an underlying backlight (not shown) or to selectively reflect incident light using switching circuitry with thin-film transistors (TFTs). The fabrication of display electrical circuitry layers is understood to be well known in the art, and specific details of this process are omitted in the interest of brevity. A bottom dielectric layer 108 overlies the electrical circuit layer 104. A pattern of metallic nanoparticles 110 with a short-range hexagonal order, shown in FIG. 1C, overlie the bottom dielectric layer 108. The pattern of metallic nanoparticles also has a long-range random order, as explained in more detail below.

A liquid crystal (LC) layer 112 overlies the pattern of metallic nanoparticles 110. An upper plate 116 overlies the LC layer 112. The upper plate 116 may include some electrical circuitry. The fabrication of LC layers is understood to be well known in the art, and specific details of this process are omitted in the interest of brevity.

The metallic nanoparticles 110 may be Al, Au, Ag, Cu, Pt, or alloys of the above-mentioned metals. The metallic nanoparticles 110 may also be shell/core structures, where shell is one of the above-mentioned metals or metal alloys, and the core is a metal, metal alloy, or a dielectric material. These metallic nanoparticles 110 typically have a size in the range of 10 to 300 nanometers. The bottom dielectric layer 108 is a material such as SiOx, SiNx, SiOxNy, MgF$_2$, CaF$_2$, SiOC, Teflon® AF, or an organic polymer.

In this aspect, a pair of electrodes 118a and 118b is formed on opposite sides of each pixel 106. As shown, the bottom dielectric layer 108 is formed underlying the electrodes. Also as shown, the electrodes 118a and 118b may be formed as interdigitated electrodes (IDEs) with a plurality of fingers, see FIG. 1B. The IDE fingers in this example extend nearly across the pixel, at which scale the metallic nanoparticles are not visible. FIG. 1C is a more detailed view of FIG. 1B, showing one pair of fingers with metallic nanoparticles having a short-range hexagonal order.

Figure 2:
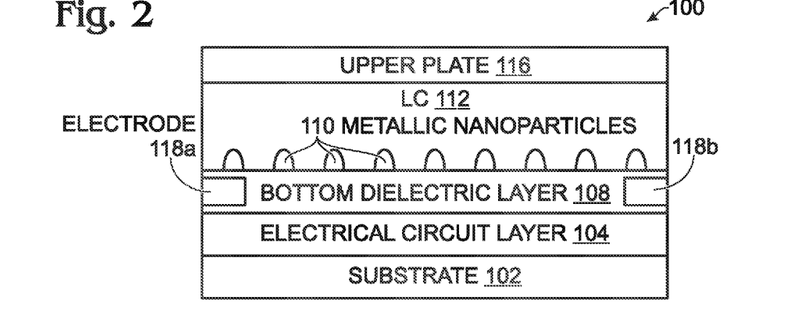
FIG. 2 is a partial cross-sectional view depicting a variation of the display of FIG. 1A where the bottom dielectric layer encloses the electrodes.

FIG. 2 is a partial cross-sectional view depicting a variation of the display of FIG. 1A where the bottom dielectric layer encloses the electrodes.

Figure 3:
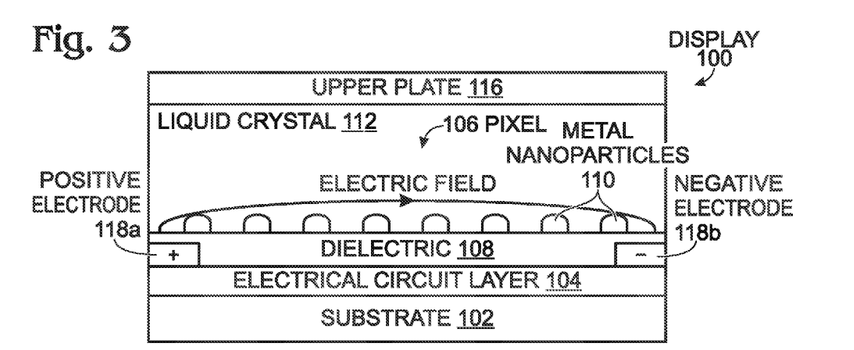
FIG. 3 is a partial cross-sectional view depicting another variation of the display of FIG. 1A where the bottom dielectric layer overlies the electrodes.

FIG. 3 is a partial cross-sectional view depicting another variation of the display of FIG. 1A where the bottom dielectric layer overlies the electrodes.

Figure 4:
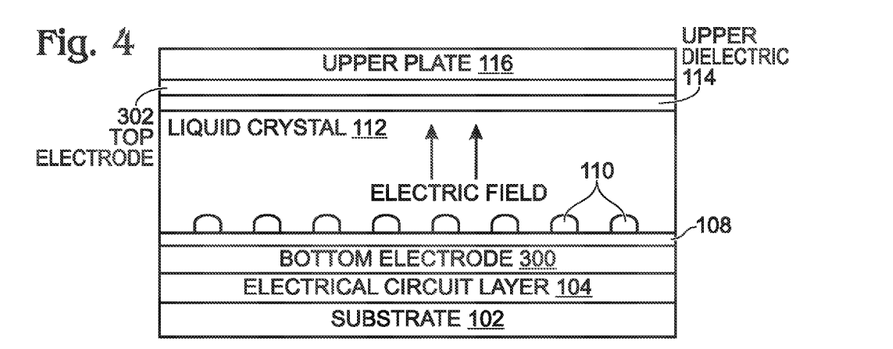
FIG. 4 is a partial cross-sectional view depicting a variation of the display of FIG. 1A with top and bottom electrodes.

FIG. 4 is a partial cross-sectional view depicting a variation of the display of FIG. 1A with top and bottom electrodes. A bottom electrode 300 is interposed between the electrical circuit layer 104 of each pixel 106 and the bottom dielectric layer 108. A top electrode 302 is interposed between an upper dielectric layer 114 and the upper plate 116.

The substrate 102 in any of the above-mentioned display pixels can be glass, quartz, silicon (or other semiconductor), or a flexible plastic substrate, upon which appropriate switching circuitry 104 (e.g. TFTs, organic transistors, etc.) have been fabricated. Each pixel of the display includes one or more pairs of positive and negative electrodes, with just one pair shown in the examples. The display also includes a bottom dielectric layer 108, preferably planarized, with an ordered array of metallic nanoparticles 110 having a pitch, or separation between nanoparticles, of about 100-400 nm.

Figure 5A:
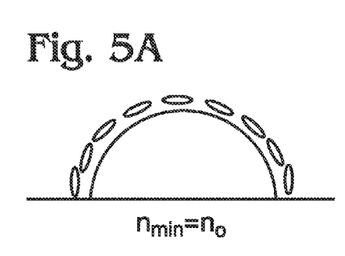
FIGS. 5A and 5B are partial cross-sectional views of LC molecules aligning with a metallic nanostructure.
Figure 5B:
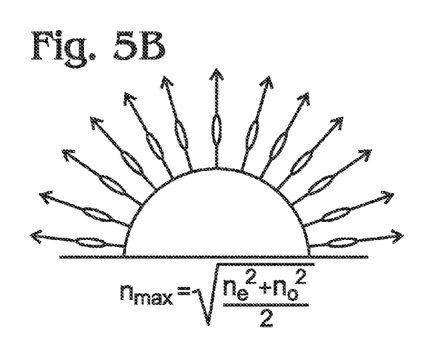

FIGS. 5A and 5B are partial cross-sectional views of LC molecules aligning with a metallic nanostructure. As noted in parent application Ser. No. 12/635,349, there are benefits to having the electric field parallel to the surface containing the metallic nanoparticle array. This alignment maximizes the alignment of the liquid crystal (LC) molecules parallel to the nanoparticle surface. This alignment also gives the largest difference in refractive index, n, between $n_{max}$ (FIG. 5B) and $n_{min}$, (FIG. 5A), and consequently the largest plasmonic effect used to shift the wavelength for peak reflectance, and thus the color of the pixel.

Because of the birefringence of liquid crystal materials, the effective refractive index that each metallic nanoparticle "sees" is in fact a squared average of the indices along two directions. Therefore, depending on the LC molecule alignment, different effective indexes can be achieved. As shown in FIG. 5A, if all the LC molecules are aligned parallel to the surface of a dome particle, the effective index reaches its minimum value $n_o$, i.e., the ordinary refractive index value. If, as shown in FIG. 5B, the LC molecules are aligned perpendicular to the surface of the dome particle, the effective index reaches the maximum value sqrt$((n_e^2+n_o^2)/2)$. This refractive index change is the largest value one can achieve with a nematic liquid crystal.

Figure 6:
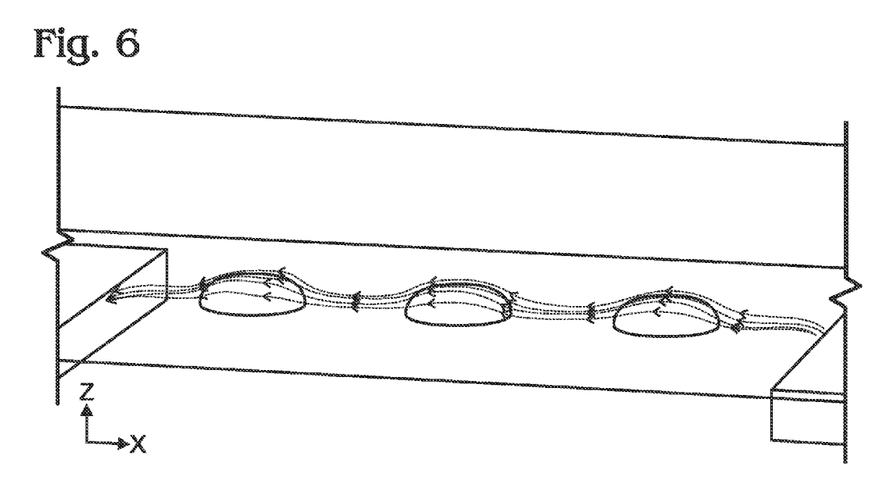
FIG. 6 is a computer simulation of two in-plane electrodes.

FIG. 6 is a computer simulation of two in-plane electrodes. When a voltage is applied in-plane, the electrical field lines are parallel to the surface of the domed nanoparticles. In this way, the LC alignment of FIG. 5A is obtained, in which the minimum effective refractive index is achieved by aligning the LC molecules parallel to the surface of the nanoparticles.

Figure 7A:
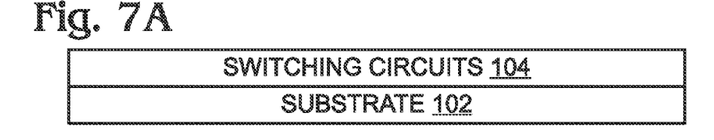
FIGS. 7A through 7I depict steps in an exemplary fabrication process for the device of FIG. 3.
Figure 7B:
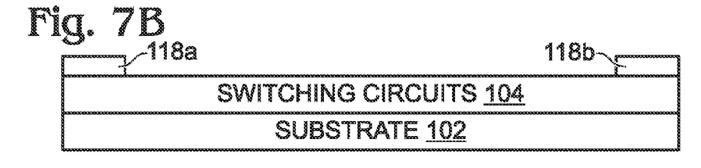

FIGS. 7A through 7I depict steps in an exemplary fabrication process for the device of FIG. 3. In FIG. 7A a substrate 102 is provided (semiconductor, glass, quartz, flex, etc.), with any required circuitry 104 on top. It is best if the top is planarized. In FIG. 7B patterned interdigitated metallic fingers are formed, creating positive and negative electrodes 118a and 118b. In one aspect, each pair of positive and negative electrodes spans one pixel. In other aspects, there may be more than one pair per pixel.

Figure 7C:
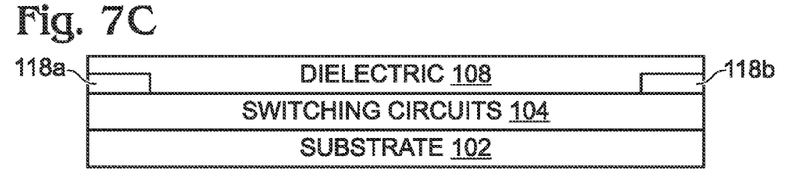
Figure 7D:
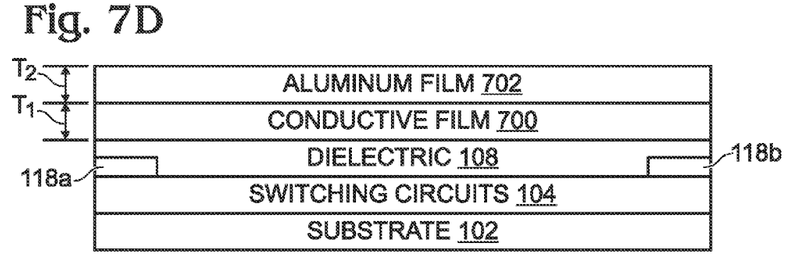

In FIG. 7C the device is covered with a dielectric 108 of appropriate thickness, and planarized. In FIG. 7D the device is covered with a conductive film 700 of thickness T1. The conductive film 700 may be a metal, such as Ti, Nb, and Ta, or a conductive oxide, like indium tin oxide (ITO). Following this, an aluminum film 702, with thickness T2 is deposited using an e-beam or sputtering processes. A thin adhesion layer (not shown) may be placed between the conductive film 700 and Al film 702. E.g., about 0.5-1 nm of Ti works well for Al on ITO.

Figure 7E:
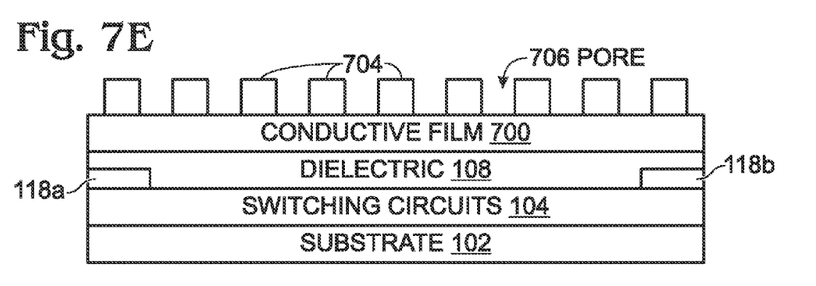

In FIG. 7E the aluminum film is anodized to produce a porous anodized Al (AAO) film 704, with the desired pore pitch and pore diameter, using known chemistries and methods. The pore pitch and diameter are dependent upon anodizing conditions, such as electrolyte, temperature, current, and time, as well as the aluminum thickness T2. The pores 706 stop at top of conductive film 700. The film 700 must be conducting in order to fabricate pores which are open all the way through the Al film. A small barrier layer may remain, which can be opened with a wet etch, such as 5 wt % phosphoric acid in water. This same etch can also be used to widen the pores to the desired diameter.

Figure 7F:
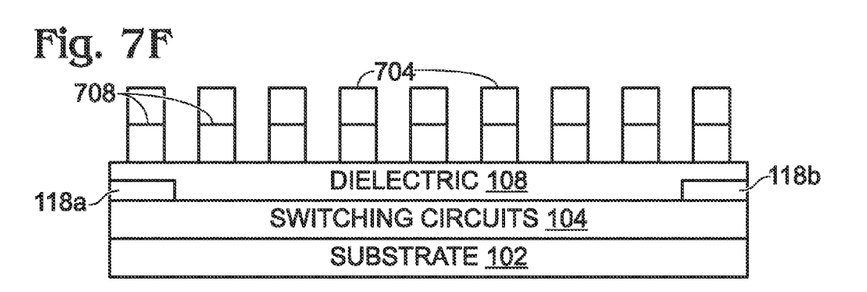
Figure 7G:
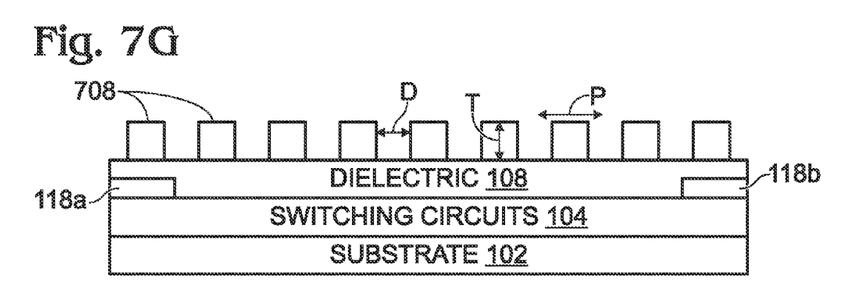

In FIG. 7F a plasma etch is performed on the conductive film 700 using the AAO film 704 as hard mask, stopping at dielectric layer 108. The result is a patterned conductive film 708. In FIG. 7G the porous AAO film is removed with a wet etch, leaving the patterned conductive film 708 and the dielectric 108. For ITO as the dielectric 108, KOH or TMAH can remove AAO but leave ITO. The patterned conductive film 708 now has pore diameter, D, pore pitch, P, and pore depth, T. The value of T is the same as T1, the thickness of the conductive film, or slightly less, after the processing steps.

Figure 7H:
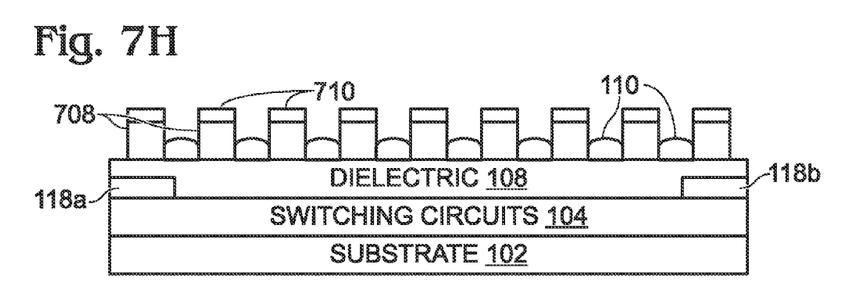

In FIG. 7H a metal such as Al or Ag, for example, is deposited via e-beam or sputtering, forming metallic nanoparticles 110 in the openings of the patterned conductive film 708, and a thin metallic film 710 on the top surface of the patterned conductive film 708. The shape of the nanoparticles is strongly influenced by the aspect ratio of pore diameter, D, to mask thickness, T1. D is set by the AAO process, but T1 is set by the thickness of conductive film. So, T (T1) and D can be tuned independently. Deposition conditions must ensure that the metal 710 on top of patterned conductive film 708 does not connect to the nanoparticles 110 at the bottom of the pores.

Figure 7I:
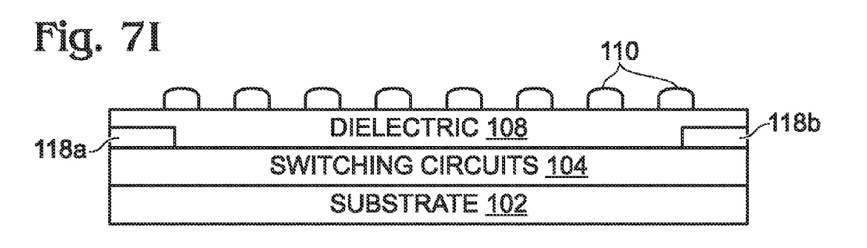

In FIG. 7I the patterned conductive film has been wet etched without etching metallic nanoparticles 110. This also lifts off and removes metal deposited on top of the patterned conductive film. For the case of ITO as the patterned conductive film and Ag as the nanoparticles 110, a standard ITO etch works. This leaves an array of metallic nanoparticles 110 on the dielectric layer 108, with electrodes 118a and 118b underlying the dielectric.

Figure 8:
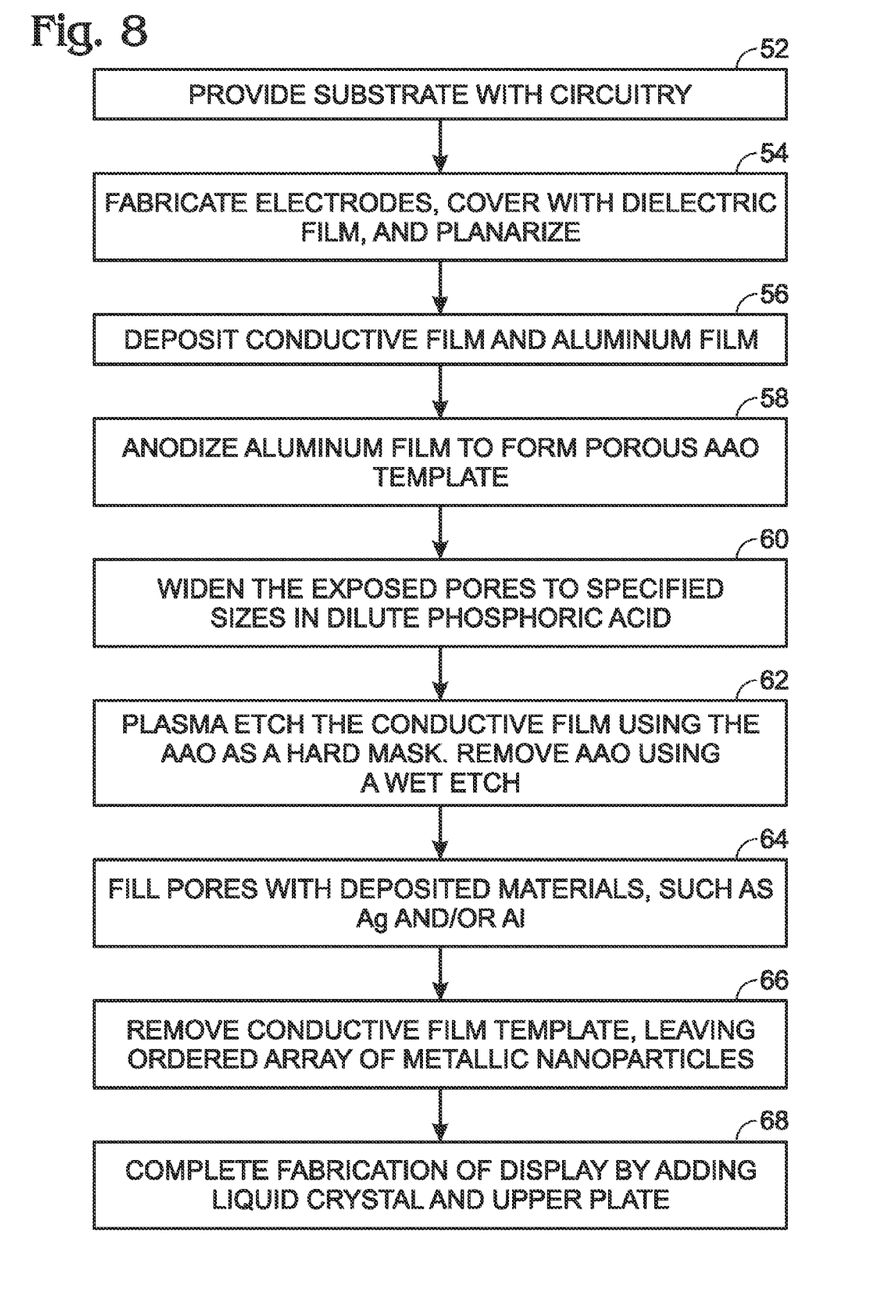
FIG. 8 is a flowchart summarizing the process steps presented in FIGS. 7A through 7I.

FIG. 8 is a flowchart summarizing the process steps presented in FIGS. 7A through 7I. Step 52 provides a substrate with an electrical circuit layer. Step 54 fabricates the electrodes and deposits a dielectric layer. Step 56 deposits the conductive film followed by the Al film. Step 58 anodizes the Al film, forming an AAO template. Step 60 wet etches to widen the AAO pores (if necessary). Step 62 plasma etches the conductive film using the AAO template as a hard mask. After removing the hard mask, Step 64 fills conductive film pores with a metallic material. In Step 66 the conductive film is removed, leaving a pattern of metallic nanoparticles. Step 68 completes the device fabrication.

In another aspect, the fabrication of structures described above may be applied to other types of displays or devices, such as biosensors. As examples of the latter, the liquid crystal of FIGS. 1A, 2, 3, and 4 can be replaced with a microfluidic chamber, carrying the substance to be detected. Depending on the application, the electrodes could be arranged to have the electric field either parallel, as in FIGS. 1A, 2, and 3, or perpendicular, as in FIG. 4, to the surface with metallic nanoparticles.

Figure 9A:
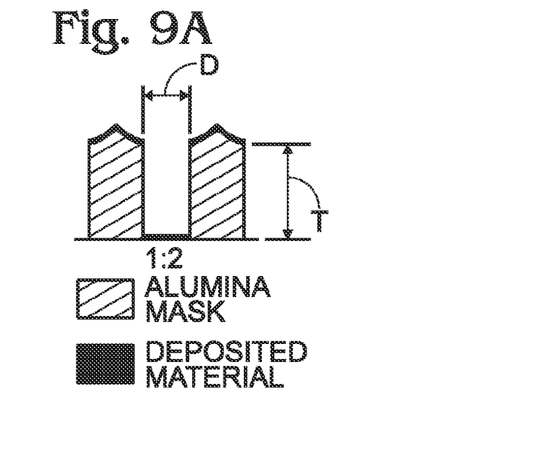
FIGS. 9A through 9D depict the shapes of deposited metallic nanoparticles using AAO masks of different aspect ratios.
Figure 9B:
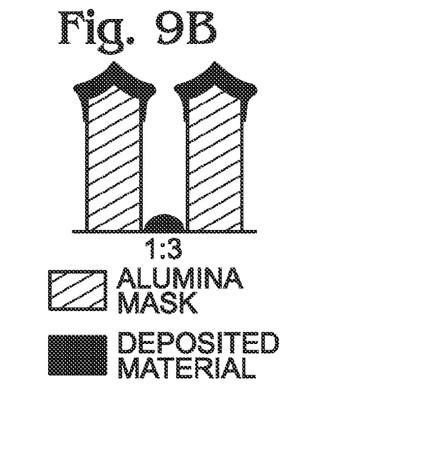
Figure 9C:
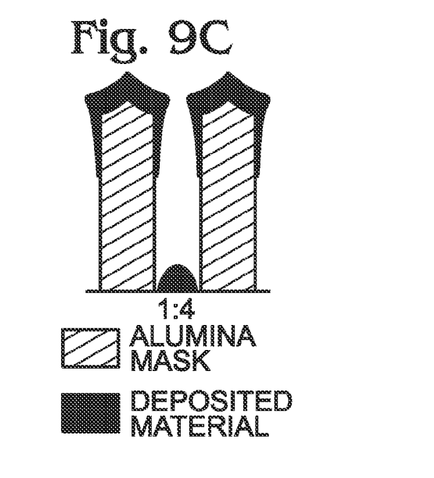
Figure 9D:
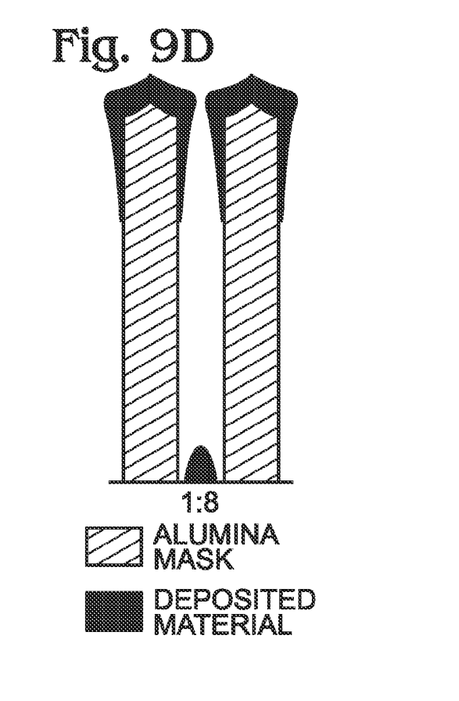

FIG. 9A through 9D depict the shapes of deposited metallic nanoparticles using AAO masks of different aspect ratios. As noted by Y. Lei and W-K. China, Chem. Mater 17, 580 (2005), the aspect ratio of a hole affects the shape of the deposited material. With a D:T=1:2 (FIG. 9A), a small amount of sputtered material can form a thin disc-shaped structure. At higher aspect ratios with more material deposited, hemispheres (1:3) (FIG. 9B) or elongated hemi-ellipsoids (1:4) (FIG. 9C) result. At even higher aspect ratios (1:8), cone-shaped nanoparticles can be made (FIG. 9D). The AAO template used as a mask was made on a conducting surface and then transferred to another substrate for deposition, which is difficult to do, especially in mass production. In contrast, the process described herein optimizes the Al film thickness for the AAO process itself, to produce good control over the hole size (D) and spacing (P), separately from the thickness of the conductive layer (T1), see FIG. 7G. This gives better control over the aspect ratio of the holes in the conductive layer mask: D:T (T1).

Figure 10A:
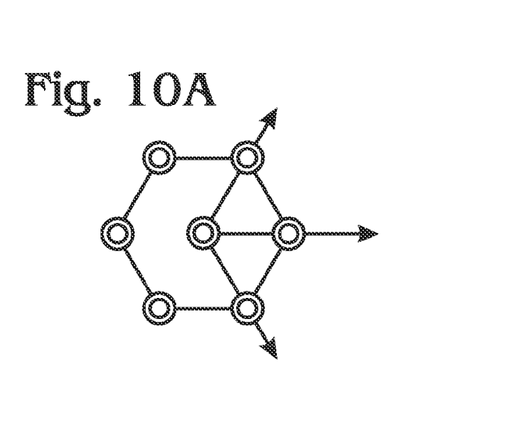
FIGS. 10A and 10B are, respectively, hexagonal and rectangular metallic nanoparticle arrangements.
Figures 10B, 11B:
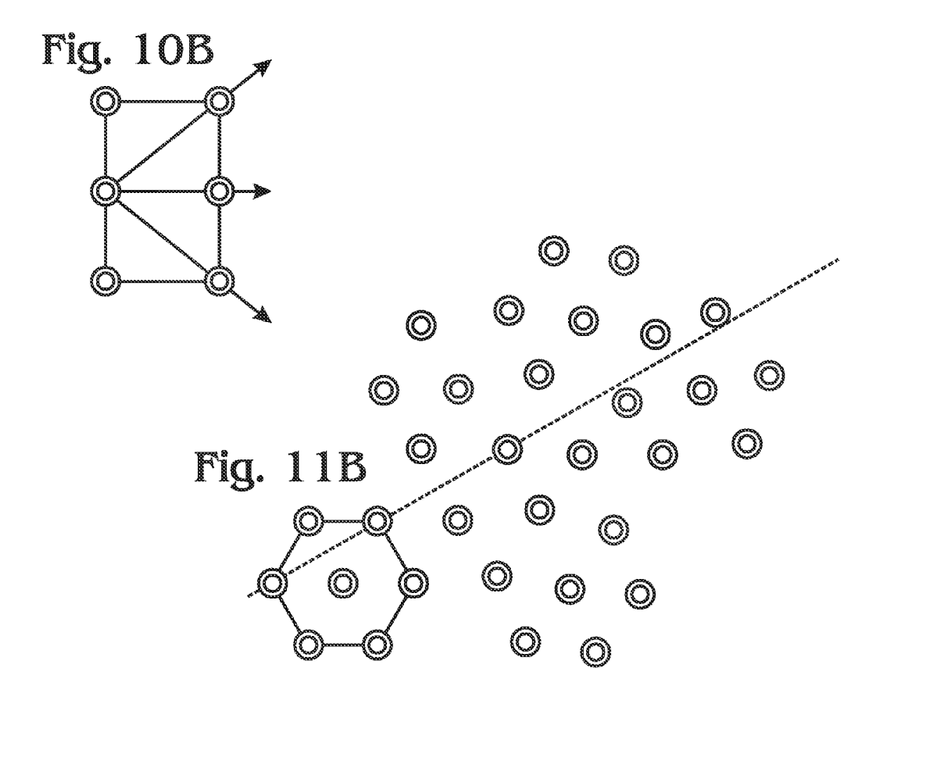
FIGS. 11A and 11B are diagrams depicting, respectively, long-range hexagonal and short-range hexagonal nanoparticle patterns.

FIGS. 10A and 10B are, respectively, hexagonal and rectangular metallic nanoparticle arrangements. For a hexagonal arrangement of metallic nanoparticles (FIG. 10A), as viewed horizontally, or +/−60 degrees azimuthally, the separation of the nanoparticles is the same. Metallic nanoparticles arranged in a hexagonal pattern perform better over a wider range of azimuthal viewing angles than particles arranged in a square or rectangular pattern. For a square or rectangular arrangement of metallic nanoparticles (FIG. 10B), as viewed horizontally, or +/−45 degrees azimuthally, the separation of the nanoparticles is significantly different.

Furthermore, there is a trade-off between regular and random arrangements of nanoparticles in a reflective display. If the array of metallic nanoparticles is random, that is, not in a regular pattern, local plasmonic resonances dominate. The viewing angle of the display is wide, but the resonance is broad, resulting in poor color purity. On the other hand, if the array is highly regular, there is a strong coupling between the regularly spaced particles, which gives good color purity. However, when the viewing angle is changed, unwanted higher order plasmonic effects can appear, changing the observed color. Thus, having a degree of order in-between perfect and random order can be desirable, to find a compromise between color purity and viewing angle and so achieve a display that performs well over a wide range of viewing angles.

The hole array produced by anodized aluminum oxide naturally results in hexagonal arrays with varying degrees of perfection. Under the right conditions, anodizing thick films of aluminum (e.g., >100 μm thick) creates extremely regular hexagonal arrays of holes. Anodizing thinner films of aluminum results in arrays with varying degrees of irregularity. These can generally be described as having a local or short-range hexagonal order, but not long-range hexagonal order. Consequently, the combination of having metallic nanoparticles in a long-range random order, but exhibiting local (short-range) order, results in a display with good performance over a wide range of viewing angles.

Figure 11A:
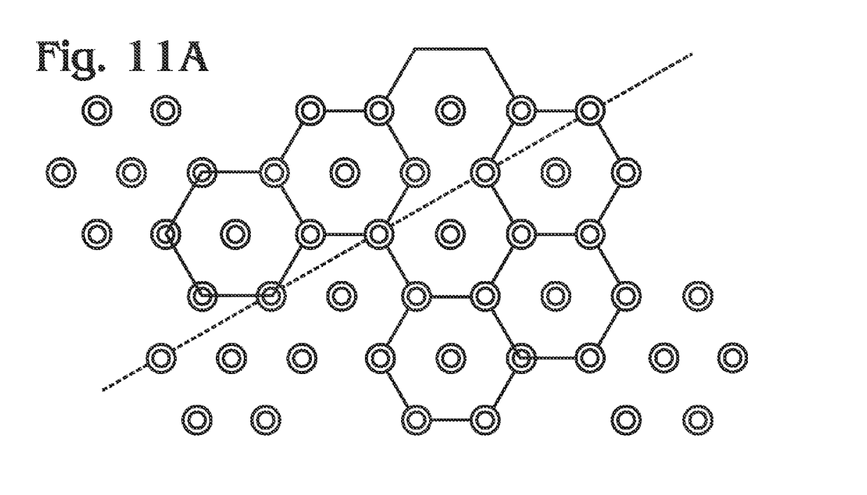

FIGS. 11A and 11B are diagrams depicting, respectively, long-range hexagonal and short-range hexagonal nanoparticle patterns. In FIG. 11A the long-range hexagonal order shows nanoparticles at the corner of each hexagon, and at the center of each hexagon. The direction and spacing of hole/nanoparticles is regular (highly correlated) over long distances. In FIG. 11B the short-range hexagonal order creates a spacing and direction between nanoparticles that becomes uncorrelated over long distances.

Figure 12:
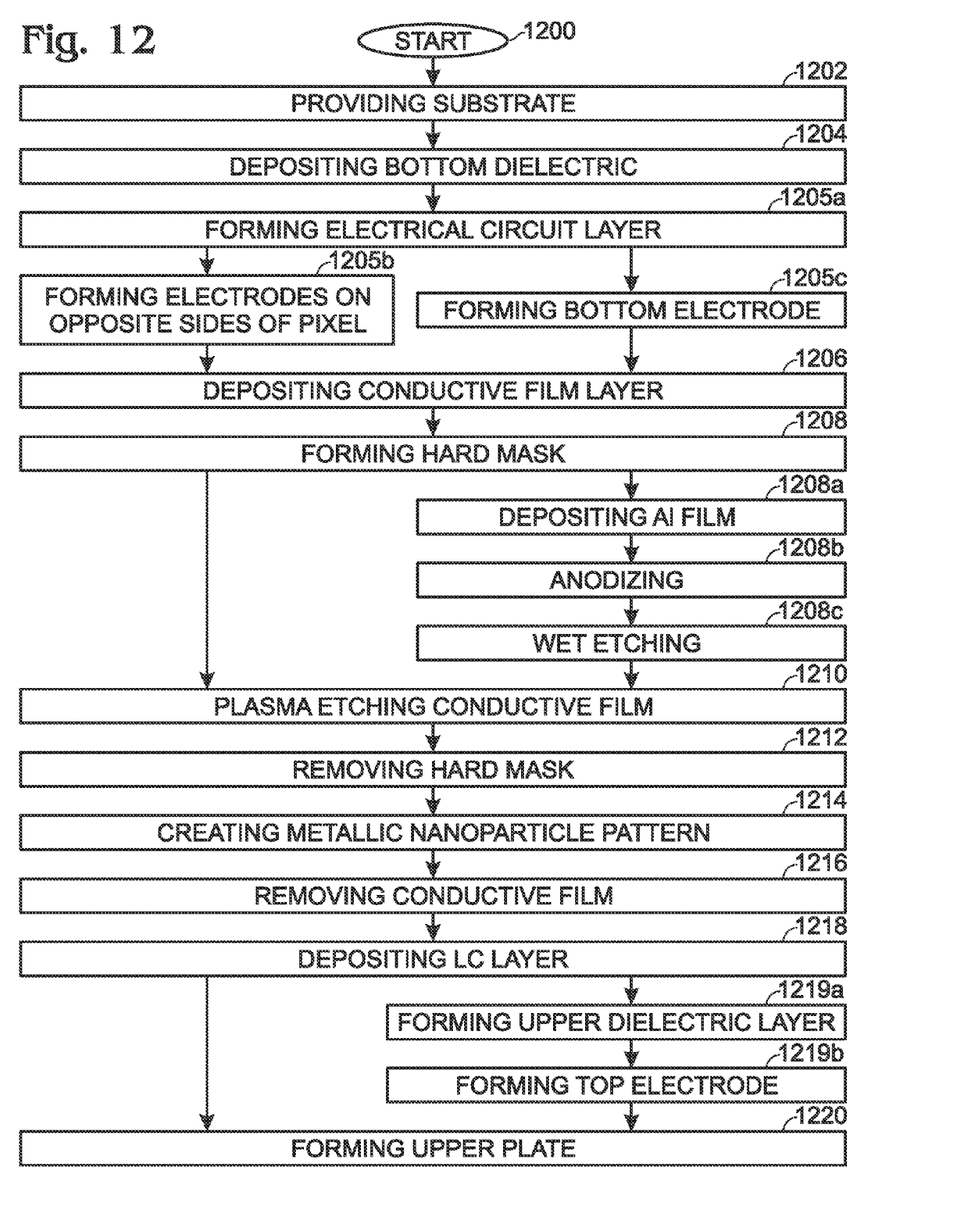
FIG. 12 is a flowchart illustrating a method for forming a reflective plasmonic display.

FIG. 12 is a flowchart illustrating a method for forming a reflective plasmonic display. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 1200.

Step 1202 provides a substrate. Step 1204 deposits a bottom dielectric layer. For example, the bottom dielectric layer may be SiOx, SiNx, SiOxNy, $MgF_2$, $CaF_2$, SiOC, Teflon® AF, or an organic polymer. Step 1206 deposits a conductive film overlying the bottom dielectric layer. For example, the conductive film may be Ti, Nb, Ta, and conductive oxides including ITO. Step 1208 forms a hard mask with nano-size openings overlying the conductive film. Step 1210 plasma etches the conductive film via nano-size openings in the hard mask, stopping at the dielectric layer. Step 1212 removes the hard mask, leaving a conductive film with nano-size openings to the dielectric layer. Step 1214 deposits metal in the nano-size openings, creating a pattern of metallic nanoparticles overlying the dielectric layer. In one aspect, the deposition method may be e-beam deposition or sputtering. Step 1216 removes the conductive film.

The metallic nanoparticles may, for example, be Al, Au, Ag, Cu, Pt, or alloys of the above-mentioned metals. In addition, the nanoparticles may be shell/core structures, where the shell is a metal or metal alloy, and the core is metal, metal alloy, or a dielectric. Typically, the metallic nanoparticles have a size in the range of 10 to 300 nm.

In one aspect, forming the hard mask with nano-size holes in Step 1208 includes substeps. Step 1208a conformally deposits an Al film overlying the conductive film. Step 1208b anodizes the Al film, creating a hard mask of porous anodized Al oxide (AAO) film. Optionally, subsequent to anodizing the Al film, Step 1208c wet etches to widen the pours. In another aspect, creating the hard mask of porous AAO film in Step 1208b includes forming a short-range hexagonal order hole pattern and long-range random order hole pattern. Then, creating the pattern of metallic nanoparticles in Step 1214 includes creating metallic nanoparticles having a short-range hexagonal order and a long-range random order.

In another aspect, Step 1206 deposits a conductive film having a thickness T, and Step 1208 forms a hard mask with openings having a diameter D. Then, creating the pattern of metallic nanoparticles in Step 1214 includes forming nanoparticles having a shape responsive to an aspect ratio of D to T.

In one aspect where an electric field parallel to film surfaces is desired, Step 1205a forms an electrical circuit layer with a plurality of rectangular pixels overlying the substrate prior to depositing the dielectric layer. Step 1205b forms a pair of electrodes on opposite sides of each pixel. Then, depositing the bottom dielectric layer in Step 1206 includes depositing the bottom dielectric layer overlying the electrical circuit layer in an arrangement underlying the electrodes (FIG. 1A), overlying the electrodes (FIG. 3), or enclosing the electrodes (FIG. 2). In any of these arrangements, the electrodes may be IDEs with a plurality of fingers. Subsequent to removing the conductive film. Step 1218 deposits a liquid crystal (LC) layer overlying the pattern of metallic nanoparticles. Step 1220 forms an upper plate overlying the LC layer.

Alternatively, if electric fields are desired perpendicular to the film surfaces, Step 1205a is performed and Step 1205c forms a bottom electrode overlying each pixel. Depositing the bottom dielectric layer in Step 1204 includes depositing the bottom dielectric layer overlying the plurality of bottom electrodes. Subsequent to removing the conductive film in Step 1216, Step 1218 deposits a LC layer overlying the pattern of metallic nanoparticles. Step 1219a forms an upper dielectric layer overlying the LC layer. Step 1219b forms a top electrode overlying the upper dielectric layer, and Step 1220 forms an upper plate overlying the top electrode.

A plasmonic display made with a controlled pattern of metallic nanoparticles has been provided with an associated process. Examples of particular materials and process steps have been presented to illustrate the invention. However, the invention is not limited to merely these examples. Other variations and embodiments of the invention will occur to those skilled in the art.

We claim:

1. A method for forming a reflective plasmonic display, the method comprising:
   providing a substrate;
   depositing a bottom dielectric layer;
   depositing a conductive film overlying the bottom dielectric layer;
   forming a hard mask with nano-size openings overlying the conductive film;
   plasma etching the conductive film via nano-size openings in the hard mask, stopping at the bottom dielectric layer;
   removing the hard mask, leaving a conductive film with nano-size openings to the bottom dielectric layer;
   depositing metal in the nano-size openings, creating a pattern of metallic nanoparticles overlying the bottom dielectric layer; and,
   removing the conductive film.

2. The method of claim 1 wherein forming the hard mask with nano-size holes includes:
   conformally depositing an Al film overlying the conductive film; and,
   anodizing the Al film, creating a hard mask of porous anodized Al oxide (AAO) film.

3. The method of claim 2 wherein forming the hard mask with nano-size holes includes, subsequent to anodizing the Al film, wet etching to widen the pours.

4. The method of claim 2 wherein creating the hard mask of porous AAO film includes forming a short-range hexagonal order hole pattern and long-range random order hole pattern; and,
   wherein creating the pattern of metallic nanoparticles includes creating metallic nanoparticles having a short-range hexagonal order and a long-range random order.

5. The method of claim 1 wherein depositing the conductive film includes depositing a film selected from a group consisting of Ti, Nb, Ta, and conductive oxides including indium tin oxide (ITO).

6. The method of claim 1 wherein creating the pattern of metallic nanoparticles includes forming metallic nanoparticles selected from a group consisting of Al, Au, Ag, Cu, Pt, alloys of the above-mentioned metals, and shell/core structures, where the shell is selected from a group consisting of a metal and a metal alloy, and the core is selected from a group consisting of a metal, metal alloy, and a dielectric.

7. The method of claim 1 wherein depositing metal in the nano-size openings includes using a deposition method selected from a group consisting of e-beam deposition and sputtering.

8. The method of 1 wherein depositing the conductive film includes depositing a conductive film having a thickness T;
wherein forming the hard mask with nano-size openings includes forming openings having a diameter D; and,
wherein creating the pattern of metallic nanoparticles includes forming nanoparticles having a shape responsive to an aspect ratio of D to T.

9. The method of claim 1 further comprising:
prior to depositing the bottom dielectric layer, forming an electrical circuit layer with a plurality of rectangular pixels overlying the substrate;
forming a pair of electrodes on opposite sides of each pixel;
wherein depositing the bottom dielectric layer includes depositing the bottom dielectric layer overlying the electrical circuit layer in an arrangement selected from a group consisting of underlying the electrodes, overlying the electrodes, and enclosing the electrodes.

10. The method of claim 9 further comprising:
subsequent to removing the conductive film, depositing a liquid crystal (LC) layer overlying the pattern of metallic nanoparticles; and,
forming an upper plate overlying the LC layer.

11. The method of claim 9 wherein forming the pair of electrodes includes forming interdigitated electrodes (IDEs) with a plurality of fingers.

12. The method of claim 1 further comprising:
prior to depositing the bottom dielectric layer, forming an electrical circuit layer with a plurality of pixels overlying the substrate;
forming a bottom electrode overlying each pixel; and,
wherein depositing the bottom dielectric layer includes depositing a bottom dielectric layer overlying the plurality of bottom electrodes.

13. The method of claim 12 further comprising:
subsequent to removing the conductive film, depositing a LC layer overlying the pattern of metallic nanoparticles;
forming an upper dielectric layer overlying the LC layer;
forming a top electrode overlying the upper dielectric layer; and,
forming an upper plate overlying the top electrode.

14. The method of claim 1 wherein creating the pattern of metallic nanoparticles includes creating metallic nanoparticles having a size in a range of 10 to 300 nanometers.

15. The method of claim 1 wherein depositing the bottom dielectric layer includes depositing a dielectric material selected from a group consisting of SiOx, SiNx, SiOxNy, MgF$_2$, CaF$_2$, SiOC, Teflon® AF, and organic polymers.

16. A method for forming a reflective plasmonic display, the method comprising:
providing a substrate;
prior to depositing a bottom dielectric layer, forming an electrical circuit layer with a plurality of rectangular pixels overlying the substrate;
forming a pair of electrodes on opposite sides of each pixel;
depositing the bottom dielectric layer overlying the electrical circuit layer in an arrangement selected from a group consisting of underlying the electrodes, overlying the electrodes, and enclosing the electrodes;
depositing a conductive film overlying the bottom dielectric layer;
forming a hard mask with nano-size openings overlying the conductive film;
plasma etching the conductive film via nano-size openings in the hard mask, stopping at the dielectric layer;
removing the hard mask, leaving a conductive film with nano-size openings to the dielectric layer;
depositing metal in the nano-size openings, creating a pattern of metallic nanoparticles overlying the dielectric layer; and,
removing the conductive film.

17. A method for forming a reflective plasmonic display, the method comprising:
providing a substrate;
prior to depositing a bottom dielectric layer, forming an electrical circuit layer with a plurality of pixels overlying the substrate;
forming a bottom electrode overlying each pixel;
depositing the bottom dielectric layer overlying the plurality of bottom electrodes;
depositing a conductive film overlying the bottom dielectric layer;
forming a hard mask with nano-size openings overlying the conductive film;
plasma etching the conductive film via nano-size openings in the hard mask, stopping at the dielectric layer;
removing the hard mask, leaving a conductive film with nano-size openings to the dielectric layer;
depositing metal in the nano-size openings, creating a pattern of metallic nanoparticles overlying the dielectric layer; and,
removing the conductive film.

* * * * *